United States Patent [19]

Earp et al.

[11] 4,290,578
[45] Sep. 22, 1981

[54] FAILSAFE CUTOFF VALVE FOR OIL AND GAS WELLS

[76] Inventors: Sherald B. Earp, P.O. Box 4586, Victoria, Tex. 77901; Louis L. Lutich; Jesse W. Harris, both of 107 E. Turbo, San Antonio, Tex. 78216

[21] Appl. No.: 938,818

[22] Filed: Sep. 1, 1978

[51] Int. Cl.³ .......................................... F16K 31/143
[52] U.S. Cl. .................................. 251/63; 137/68 A; 137/246.22; 251/324
[58] Field of Search ............... 137/68 A, 246, 246.11, 137/246.14, 246.17, 246.21, 246.22; 251/62, 63, 63.5, 63.6, 324, 328

[56] References Cited
U.S. PATENT DOCUMENTS

| | | | |
|---|---|---|---|
| 2,636,713 | 4/1953 | Hamer | 251/328 X |
| 2,834,569 | 5/1958 | Nickerson | 251/62 |
| 2,869,574 | 1/1959 | Volpin | 251/328 X |
| 2,877,780 | 3/1959 | Whitley et al. | 137/68 A |
| 3,159,378 | 12/1964 | Haag | 251/63 X |
| 3,203,442 | 8/1965 | Grove | 251/328 X |

*Primary Examiner*—Harold W. Weakley
*Attorney, Agent, or Firm*—Gunn, Lee & Jackson

[57] ABSTRACT

A failsafe cutoff valve that may be used with oil and gas wells is shown. A cylindrical body portion has a center bore extending longitudinally therethrough. A piston is located inside of the center bore. The cylindrical body portion has crossbores along a straight line that perpendicularly intersect the center bore. Received into the crossbores and secured in position are generally cylindrical flanges having a saddle shaped lower surface to conform with the center bore. An undercut in the saddle shaped lower portion provides a means for sealing along the piston. The piston is slideably retained inside of the center bore and has a transverse bore therethrough normally positioned along the same axis as the crossbores. End flanges seal around portions of the piston that extend from the center bore and prevent leakage from the center bore. The piston may be activated by any of a number of means, including a remotely located source of high pressure fluid.

3 Claims, 5 Drawing Figures

FAILSAFE CUTOFF VALVE FOR OIL AND GAS WELLS

BACKGROUND OF THE INVENTION

The present invention relates to a failsafe cutoff valve that is designed for use to prevent blowouts in oil and gas wells. The failsafe cutoff valve should be located below normal valving commonly called a "Christmas tree", and is designed for long periods of inactivity, yet having extremely high reliability when a need for activation exists.

BRIEF DESCRIPTION OF THE PRIOR ART

Prior to the present invention, numerous types of valves have been used in the past to prevent blowouts in oil and gas wells. Normally these valves form a portion of the "Christmas tree" for producing wells or for shut-in wells. However, in the event there is a blowout due to a failure of the lowermost valve or other valves in the Christmas tree, the Christmas tree may become totally inaccessible due to a fire. If this occurs, even though the valves may still function properly, it may be impossible to get to the Chrimstmas tree even with protective clothing to cut off the flow of hydrocarbons from the well.

A previous problem that has existed in the prior art is that the lowermost valve normally remains inactive for long periods of time. However, once a requirement exists to change the position of the lowermost valve, it becomes very important to change the position of the valve very quickly with the minimum possibility of failure. Otherwise, a blowout can occur along with attendant dangers of a possible fire.

Other types of blowout preventers that have been used in the past have been wafer type gate valves normally forming a lowermost portion of the Christmas tree. The wafer portion of the gate valve may be in one solid piece, or in separate pieces, depending upon whether or not items, such as tubing or wire lines, extend into the well. These items may be used in the normal recovery of hydrocarbons or when working on the well. Various types of valves have used pressure detectors to determine if a high pressure fluid starts flowing through the wellhead. The high pressure fluid will cause a pressure differential to activate a cutoff valve via a piston. Such cutoff valves have problems with complexity and do not provide the simple reliability as does the present invention. If the pressure differential is other than as designed into the cutoff valves, they may not function properly. Also, due to corrosion as may occur over a period of time for traditional valves, the valves may not function when required, thereby resulting in a blowout.

SUMMARY OF THE INVENTION

It is an object of the present invention to provide a failsafe cutoff valve for oil and gas wells.

It is another object of the present invention to provide a failsafe cutoff valve for oil and gas wells that may be economically produced, remain inactive for a long period of time, yet still function properly upon a requirement for activation.

It is another object of the present invention to provide a failsafe cutoff valve that may be economically produced with most machining being on a lathe or a drill press.

A cylindrical body portion has a center bore therethrough along its longitudinal axis, which center bore receives a piston therein. Crossbores are located along an axis which intersects the center bore of the cylindrical body portion, said crossbores receiving therein generally cylindrical flanges which have saddle shaped lower portions to conform with the center bore. The cylindrical flanges also have a saddle shaped undercut around the saddle shaped lower portions, which undercut is adjacent to the center bore of the cylindrical body portion. The cylindrical flanges are secured into position by any traditional means. Thereafter, the center bore of the cylindrical body is finished to be relatively smooth. A hole is drilled and threaded from the outer surface of the cylindrical body portion to the saddle shaped lower undercut for receiving a fitting therein. Through the fitting a pliable plastic material is injected for sealing purposes.

The piston has a transverse bore therethrough with the open position for the failsafe cutoff valve aligning the transverse bore of the piston with the generally cylindrical flanges inserted in the crossbores of the cylindrical body portion. A key and groove in one side of the piston prevents the piston from rotating about the longitudinal axis of the cylindrical body portion thereby causing non-alignment of the transverse bore with the cylindrical flanges due to rotation.

A seal is provided between the piston and the cylindrical body portion by means of end flanges in each end of the cylindrical body portion, which end flanges are secured in position by crossbolts extending the length of the cylindrical body portion. A washer and shear pin retain the piston in a position so that the transverse bore aligns with the crossbores of the cylindrical body portion. Upon a requirement for activation, the piston breaks the shear pin and moves along to its longitudinal axis to a second location thereby blocking any flow of fluids through the crossbores.

The piston may be activated by any of a number of means, such as a remotely located source of pressurized fluid acting against one end of the piston. The reason for the remote location of the pressurized fluid is to provide a remote means away from the well for shutting off the well, especially in the cases of fire. By simply creating a pressure differential across the piston, the piston may be moved from one side of the cylindrical body portion to the other, or from the open position to the closed position. The slot along the outer surface of the piston also prevents fluid from being trapped at either end of the piston during activation.

DESCRIPTION OF THE PREFERRED EMBODIMENT

Figure 1:
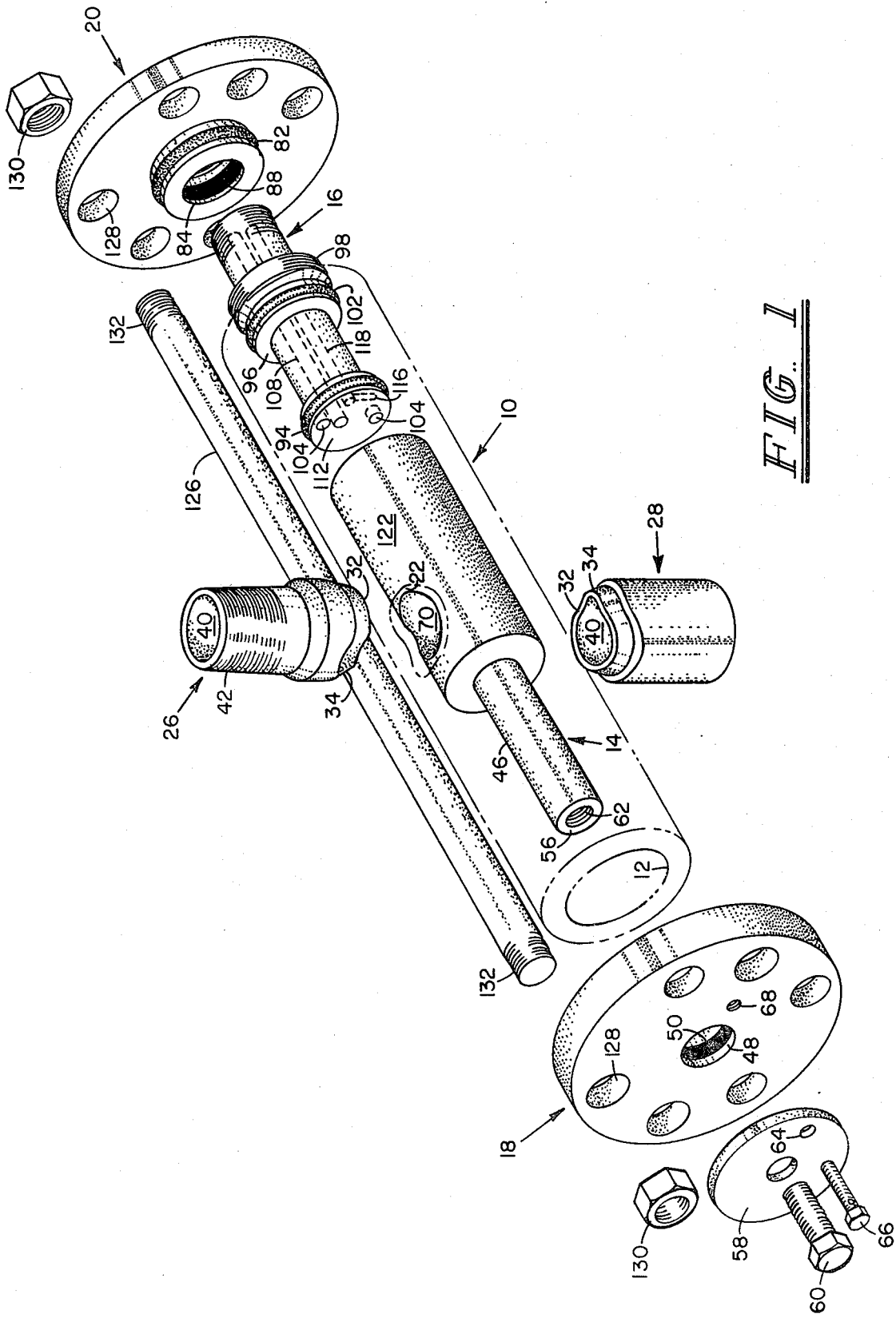
FIG. 1 is an exploded perspective view of a failsafe cutoff valve with a cylindrical body portion being shown in reference lines.
Figure 3:
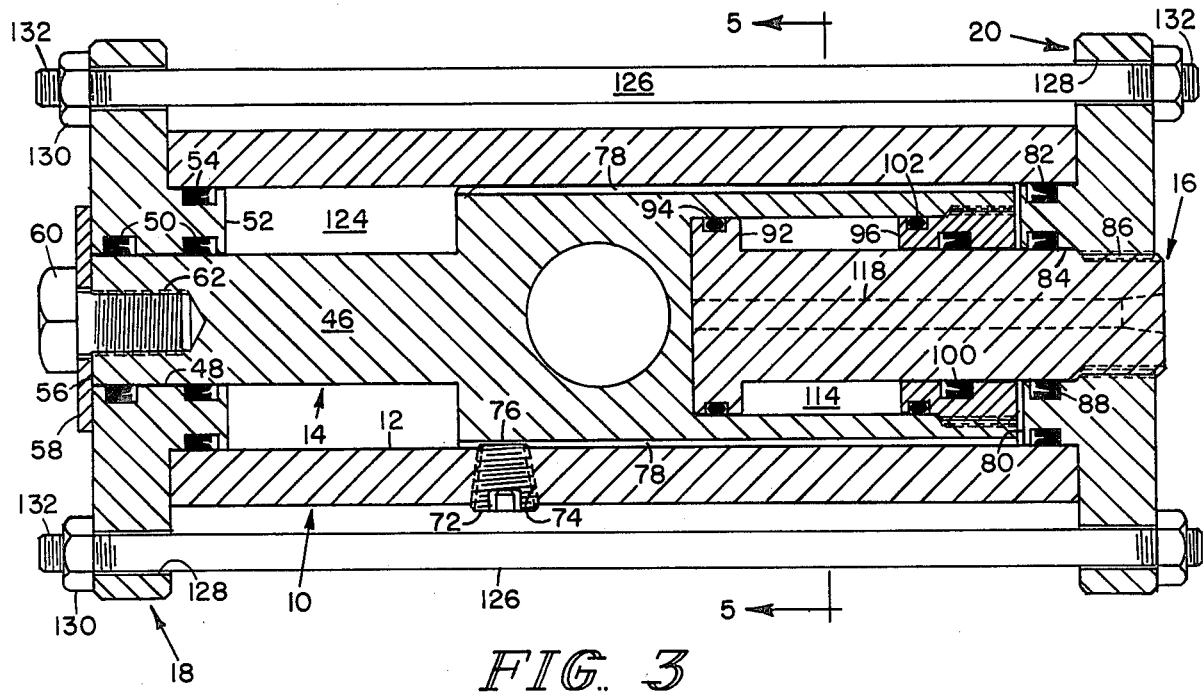
FIG. 3 is a cross-sectional view of FIG. 2 along section line 3—3.
Figure 2:
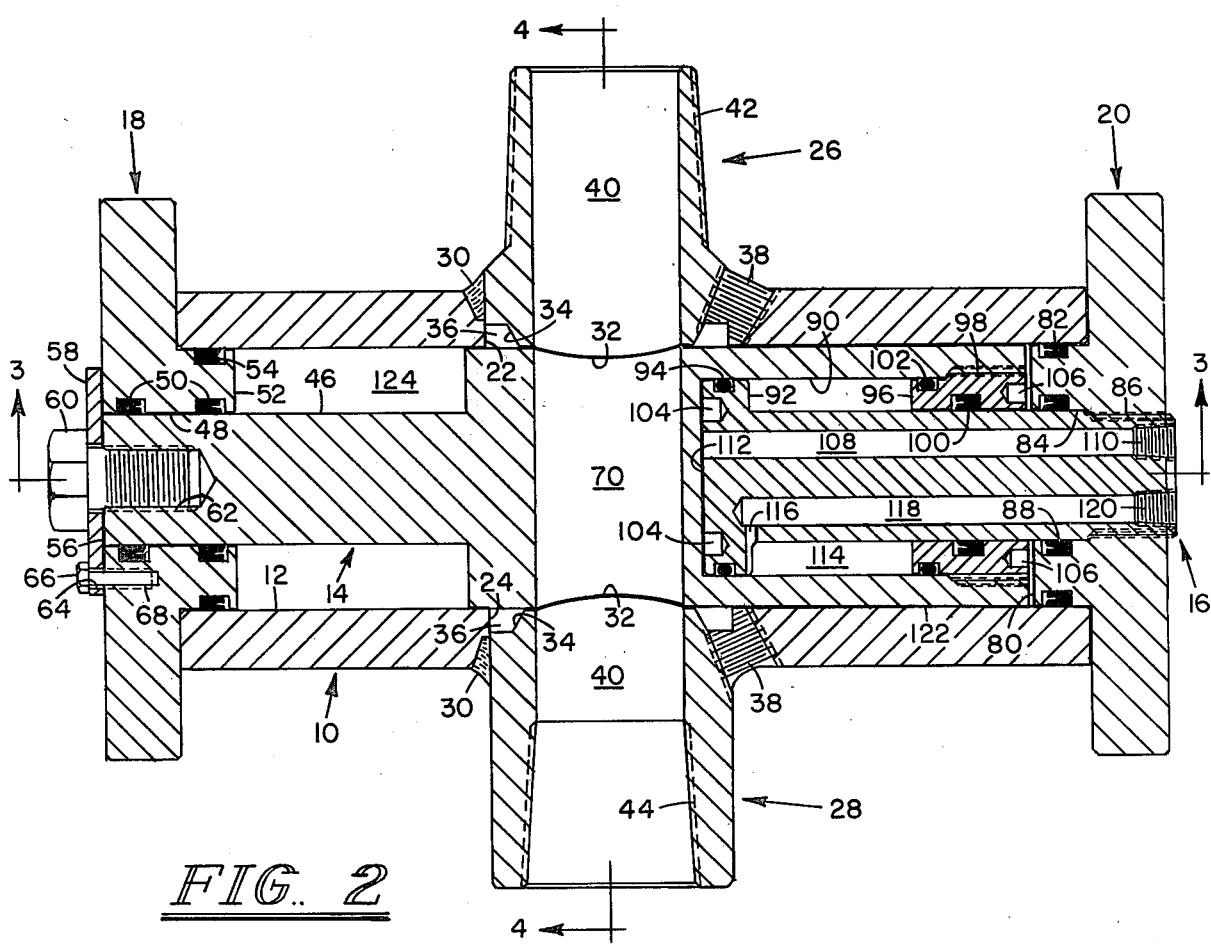
FIG. 2 is a longitudinal cross-section view of the failsafe cutoff valve as assembled.
Figure 5:
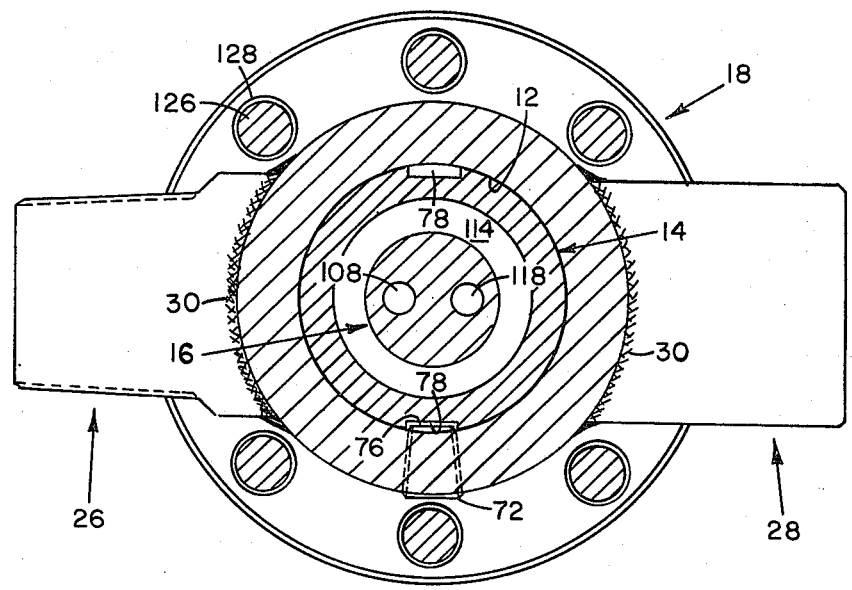
FIG. 5 is a cross-sectional view of FIG. 3 along section lines 5—5.
Figure 4:
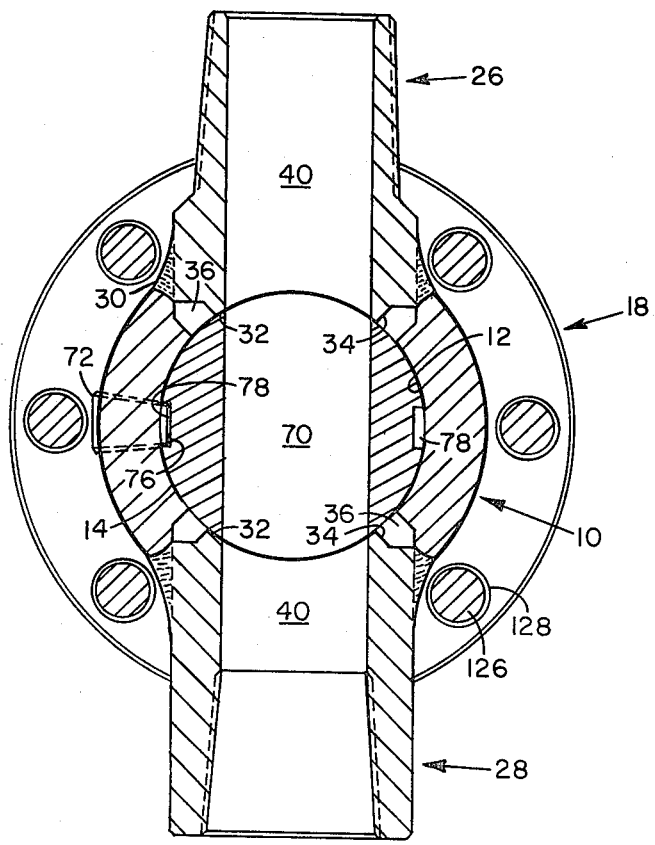
FIG. 4 is a cross-sectional view of FIG. 2 along section lines 4—4.

Since all of the Figures, FIGS. 1-5, show the same failsafe cutoff valve either in exploded perspective or sectional view, reference will be made to all Figures jointly unless otherwise specified hereinbelow.

A cylindrical body portion 10 has a center bore 12 therethrough along its longitudinal axis. The cylindrical body portion 10 can be formed by any of a number of ways, including casting. However, the center bore should be smooth for sealing purposes as will be explained hereinbelow. Contained inside of the center bore 12 is a piston 14. Located in one end of the piston 14 is an actuator 16. The piston 14 and actuator 16 are held in position by end flanges 18 and 20. Perpendicularly intersecting the center bore 12 are crossbores 22 and 24. Secured in crossbore 22 is a male flange 26, and secured in crossbore 24 is a female flange 28.

The crossbores 22 and 24 are large enough to receive therein in a close abutting relationship the respective flanges 26 and 28. The flanges 26 and 28 are then secured in position by any conventional means, such as welding, as illustrated by well joints 30. The flanges 26 and 28 are generally cylindrical in shape with a saddle shaped lower edge 32 (see FIG. 1). Around the outer edge of the saddle shaped lower edge 32 is an undercut 34 thereby providing a space between the crossbores 22 and 24, piston 14 and the saddle shaped lower edge 32 for receiving a sealant 36 therein. The space is connected by means of a threaded bore 38 that extends externally to the cylindrical body portion 10, which threaded bore 38 is designed to receive a fitting therein. The fitting (not shown), which may be similar to a grease fitting, may be used to force sealant 36 into the aforementioned space. The sealant 36 is a pliable substance, such as a pliable plastic. By increasing the pressure of the sealant 36, any sealing pressure of a fairly large range can be created inside of the failsafe valve.

The male flange 26 and the female flange 28 have a flow passage 40 therethrough. The male flange 26 has external threads for connection to the next adjacent tubing (not shown), and the female flange 28 has internal threads 44 for connection to the next adjacent tubing (not shown). It is the intent of the present invention that the threads 42 and 44 would connect the failsafe cutoff valve at the wellhead as the first valving connecting to the production tubing (not shown).

After the flanges 26 and 28 are secured in position by welding, and the threaded bore 38 is drilled and threaded, the innermost portion of the flanges 26 and 28 are reamed to be smooth out the center bore 12 to slideably receive piston 14 therein.

The piston 14 has a reduced diameter shank 46 on one end thereof which extends through a center opening 48 of end flange 18. Seals 50 provide a good seal between the reduced diameter shank 46 and the center opening 48 of the end flange 18. The end flange 18 has an inner ring portion 52 that is received inside of the center bore 12 and is sealed therewith by means of seal 54.

The end 56 of the reduced diameter shank 46 abuts washer 58 held in position by bolt 60 threadably connecting into threaded hole 62 of shank 46. Also extending through a hole 64 located in the outer periphery of the washing 58 is a shear pin 66 that threadably connects into threaded hole 68 of end flange 18.

Extending perpendicular to the longitudinal axis of the piston 14 is a transverse bore 70 through which the hydrocarbons may flow during normal production, as well as flow passages 40 of flanges 26 and 28. The piston 14 is designed to be received inside of center bore 12 in a sliding contiguous relationship with sealant 36 providing a good seal therebetween.

To keep the piston 14 from rotating inside of center bore 12, a key pin 72 is threadably connected via threaded hole 74 so that the innermost end 76 is received in one of the slots 78 cut along the longitudinal sides of piston 14. (See FIGS. 3, 4 and 5). The slots 78 also provide a means for fluid to move from one end of the piston 14 to the other end thereof during movement of the piston 14 as will be explained hereinafter.

End flange 20, on the opposite end of cylindrical body portion 10 from the previously described end flange 18, has an inner ring portion 80 received inside of center bore 12. Seal 82 prevents leakage between the center bore 12 and end flange 20. Contained inside of a center opening 84 is the actuator 16. The actuator 16 is threadably connected to the end flange 20 by means of raised threads 86 in center opening 84. A seal between the actuator 16 and the end flange 20 is provided by seal 88.

The actuator 16 is received inside of an enlarged cylindrical opening 90 of piston 14. A flanged end 92 of the actuator 16 is received inside of the enlarged cylindrical opening 90 and slideably seals therewith by means of seal rings 94. After the flanged end 92 of the actuator 16 is received inside of the large cylindrical opening 90, the end of the enlarged cylindrical opening 90 is closed by closure ring 96. The closure ring 96 has raised threads 98 thereon for threadably connecting inside of enlarged cylindrical opening 90. Seal ring 100 provides a good seal between closure ring 96 and actuator 16. O-ring seal 102 prevents leakage along raised threads 98. Key holes 104 and 106 provide a means for assembly of the actuator 16 and the closure ring 96, respectively.

Actuator 16 has a passage 108 therethrough which connects to a source of high pressure fluid (not shown) through threaded opening 110 to the face 112 of the actuator 16. By opening appropriate valving, the source of high pressure fluid, such as oil, is delivered to the face 112 of the actuator 16 thereby forcing the piston 14 as viewed in FIG. 2 to the left. Such movement of the piston 14 to the left by a suitable high pressure fluid will break the shear pin 66 at a predetermined force.

Oil that may be trapped in annular space 114 is returned via crossbore 116, passage 118 and threaded opening 120 to the source of high pressure fluid.

After the actuator 16 has been assembled inside of the piston 14, the closure ring 96 installed and end flange 20 threadably connected to actuator 16, it is ready for assembly inside of center bore 12 of the cylindrical body portion 10. After the piston 14 has been inserted complete with actuator 16 and end flanges 18 and 20, it is secured in position by means of crossrods 126 extending through openings 128 in end flanges 18 and 20. The crossrods 126 via nuts 130 contained on the threaded ends 132 thereof bring the end flanges 18 and 21 in a close abutting relationship with the cylindrical body portion 10. While any particular number of crossrods 106 may be used, in this preferred embodiment a total of six crossrods 126 are shown with spacing being provided to keep from interfering with male flange 26 and female flange 28 as can be more clearly seen in FIG. 5.

METHOD OF OPERATION

The present failsafe cutoff valve is designed particularly for use at the wellhead as the first valving for the hydrocarbons being produced. In normal operations, the failsafe valve will be in the position as shown in FIGS. 2, 3, 4 and 5. If leakage should occur in the failsafe valve in its static condition, additional sealant 36 can be pumped into the failsafe valve via threaded bore 38 and the fitting (not shown) contained therein.

Assume that a blowout condition exists for a particular well and it becomes imperative that the well be shut off. By having a source of high pressure fluid at a remote location connected via a conduit and appropriate valving (not shown), a high pressure fluid can be delivered to passage 108 of actuator 16 without danger to the personnel involved. The high pressure fluid will act between the face 112 of the actuator 16 and the cross-sectional area of the enlarged cylindrical opening 90. This high pressure fluid will force the piston 14 to the left (as viewed in FIGS. 2 and 3) thereby shearing the shear pin 66. Sealant 36 will provide a good seal around the outer enlarged cylinder 22 of piston 14. The movement of the transverse bore 70 to the left with the piston 14 will stop the flow through the failsafe cutoff valve.

During movement of the piston 14 to the left, any air or fluids trapped in annular space 124 may move to the opposite end of piston 14 via slots 78. Concerning fluid, such as oil contained in annular space 114, the fluid returns through crossbore 116, passage 118 and threaded opening 120 to the source of high pressure fluid at a remote location. By movement of the piston 14 to the left, all flow through the failsafe cutoff valve will be essentially stopped. If additional sealant 36 is necessary to prevent minor leakage, additional sealant may be pumped into the failsafe cutoff valve. By this time, any fires should be out or the danger thereof eliminated.

After the problem has been corrected, the pressures inside of passages 108 and 118 may be reversed by appropriate valving at the remote location thereby returning piston 14 to the position as shown in FIGS. 2, 3, 4 and 5. By replacing the shear pin 66, the failsafe cutoff valve has now been restored to normal operation.

We claim:

1. A failsafe cutoff valve for use in production of fluid hydrocarbons from a well comprising:
   cylindrical body portion having a longitudinal bore therethrough;
   crossbores in said cylindrical body portion intersecting said longitudinal bore;
   first flange means adapted for connecting to production tubing, said first flange means having undercuts and being secured in said crossbores and having flow passages therethrough;
   piston means located in said longitudinal bore, said piston means having a transverse bore therethrough with a first position of said piston means aligning said transverse bore with said crossbores;
   actuator means extending into said longitudinal bore for moving said piston means to a second position wherein a body portion of said piston means blocks flow through said crossbores;
   means for retaining said piston means in said first position until desired movement by said actuator means;
   second flange means for sealing ends of said cylindrical body portion; and
   means for sealing around said flow passages between said cylindrical body portion and said piston means,
   said actuation means including inlet and outlet flow passages extending through a stationary member into an internal bore in said body portion of said piston means, and stationary member slideably sealing with said internal bore, said actuation means sealably connecting through said second flange means to one end of said piston means and being adapted for remote operation to move said piston means to said second position.

2. The failsafe cutoff valve as given in claim 1 wherein said stationary member is secured by and extends through said second flange means, said stationary member having inner flange for sealing with said internal bore of said piston.

3. A failsafe cutoff valve as given in claim 2 wherein said stationary means includes assembly ring removably connected thereto and located inside said internal bore opposite said inner flange to define an annular space, said outlet flow passage connecting said annular space through said second flange means.

* * * * *